(12) United States Patent
Hsia et al.

(10) Patent No.: US 8,004,600 B2
(45) Date of Patent: Aug. 23, 2011

(54) COMPOSITE IMAGE DEVICE AND RELATED PORTABLE ELECTRONIC DEVICE

(75) Inventors: Wen-Nan Hsia, Taipei Hsien (TW); Hsin-Chuan Hsu, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 360 days.

(21) Appl. No.: 12/431,755

(22) Filed: Apr. 29, 2009

(65) Prior Publication Data

US 2010/0033612 A1 Feb. 11, 2010

(30) Foreign Application Priority Data

Aug. 6, 2008 (TW) .............................. 97214078 U

(51) Int. Cl.
*H04N 5/222* (2006.01)
*H04N 5/225* (2006.01)
*G03B 13/00* (2006.01)
*G03B 15/03* (2006.01)
*G06K 7/10* (2006.01)

(52) U.S. Cl. ........ 348/371; 348/335; 348/376; 396/106; 396/176; 235/462.42

(58) Field of Classification Search .................. 348/370, 348/371, 335, 343, 344, 340, 374–376; 396/106, 396/109, 176; 359/204.1, 204.5; 235/454, 235/462.1, 462.42
See application file for complete search history.

(56) References Cited

U.S. PATENT DOCUMENTS

| | | | | |
|---|---|---|---|---|
| 5,589,905 A * | 12/1996 | McIntyre | ....................... | 396/106 |
| 7,021,542 B2 * | 4/2006 | Patel et al. | .................... | 235/454 |
| 7,152,795 B2 * | 12/2006 | Tsikos et al. | ............. | 235/462.01 |
| 7,295,720 B2 * | 11/2007 | Raskar | ............... | 348/371 |
| 2002/0171754 A1 * | 11/2002 | Lai et al. | ........................ | 348/371 |
| 2003/0218689 A1 * | 11/2003 | Angeli et al. | ................. | 348/370 |
| 2004/0031851 A1 * | 2/2004 | Bianculli et al. | ......... | 235/462.41 |
| 2006/0027659 A1 * | 2/2006 | Patel et al. | .................... | 235/454 |
| 2009/0284622 A1 * | 11/2009 | Wills | ....................... | 348/231.99 |

* cited by examiner

Primary Examiner — Nhan T Tran
(74) Attorney, Agent, or Firm — Winston Hsu; Scott Margo

(57) ABSTRACT

A composite image device having image capturing, laser pointing, lighting and related functions in one includes a first perspective window, a second perspective window, a third perspective window, an image capturing module, laser source module, a light source module and a switchable light modulating module. The image capturing module captures ambient light through the first perspective window to generate digital image data. The laser source module emits a laser through the second perspective window. The light source module emits illuminating light through the third perspective window. The switchable light modulating module includes at least a light modulating gate and a switching device for moving the at least a light modulating gate to a position relatively parallel to the second or third perspective window to modulate the emitted laser or the emitted illuminating light.

22 Claims, 9 Drawing Sheets

US 8,004,600 B2

COMPOSITE IMAGE DEVICE AND RELATED PORTABLE ELECTRONIC DEVICE

BACKGROUND OF THE INVENTION

1. Field of the Invention

The present invention relates to an image device and related electronic device, and more particularly to a composite image device combined with digital photographing, laser pointing and bar-code scan and related portable electronic device.

2. Description of the Prior Art

Nowadays, consumption electronic products gradually evolve into "All in one" feature. Therefore, for portable electronic product development, manufactures attempts to integrate various daily demands into one model. Consumers can choose a composite electronic product to decrease inconvenience caused by too many products in hand. So far, the products which consumers have used the most in daily lives are digital cameras, laser pointers and quick response (QR) code scanners.

In general, a mobile phone is provided with functionality of wireless communication, simple image capturing and music listening. A higher level multi-function camera-mobile phone even has a flash. In the camera mode, the mobile phone with a QR code scan function displays a scanning area calibration pattern on the monitor. A user calibrates a QR code on captured image within coverage of the scanning area calibration pattern for decoding. Please refer to FIG. 8, which is a schematic diagram of a QR code scanning area calibration pattern 80 generated from a mobile phone 900 according to the prior art. In FIG. 8, when the mobile phone 900 enters the camera mode, a monitor 910 displays a captured image and a scanning area calibration pattern 90. The user must restrict a QR code image 920 of the captured image within the scanning area calibration pattern 90. However, the use can have problem with calibration if the captured image is unclear or the resolution is low.

SUMMARY OF THE INVENTION

It is therefore an objective of the present invention to provide a composite image device and related portable electronic device for providing functions of image capturing, laser pointing and bar code scanning and generating an aimed pattern on a desired bar code in order to increase convenience of bar code scanning.

The present invention discloses a composite image device including a first perspective window, a second perspective window, a third perspective window, an image capturing module, laser source module, a light source module and a switchable light modulating module. The image capturing module includes a light-sensing device for capturing ambient light through the first perspective window to generate digital image data. The laser source module emits a laser through the second perspective window. The light source module emits illuminating light through the third perspective window. The switchable light modulating module includes at least a light modulating gate and a switching device for moving the at least a light modulating gate to a position relatively parallel to the second or third perspective window to modulate the emitted laser or the emitted illuminating light.

The present invention further discloses a portable electronic device. The portable electronic device includes a housing, a display panel, a digital signal processor, a connecting device and a composite image device. The digital signal processor is coupled to the display panel and used for processing a digital image data and outputting the processed digital image data to the display panel and generating a first controlling signal, a second controlling signal and a third controlling signal. The composite device is coupled to the connecting device and includes a first perspective window, a second perspective window, a third perspective window, an image capturing module, laser source module, a light source module and a switchable light modulating module. The image capturing module includes a light-sensing device for capturing ambient light through the first perspective window to generate digital image data. The laser source module emits a laser through the second perspective window. The light source module emits illuminating light through the third perspective window. The switchable light modulating module includes at least a light modulating gate and a switching device for moving the at least a light modulating gate to a position relatively parallel to the second or third perspective window to modulate the emitted laser or the emitted illuminating light.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
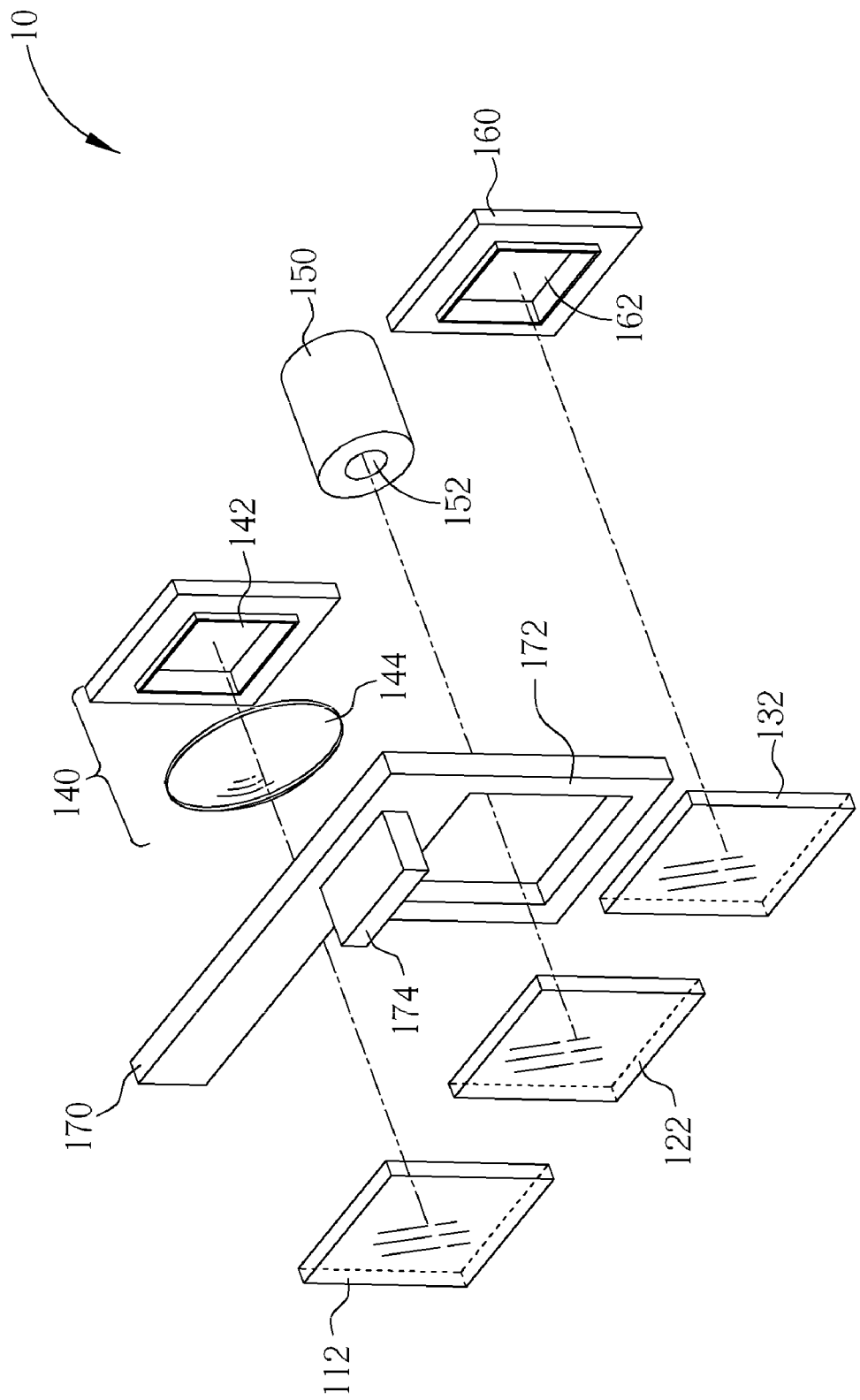
FIG. 1 is a schematic diagram of a composite image device according the first embodiment of the present invention.
Figure 2:
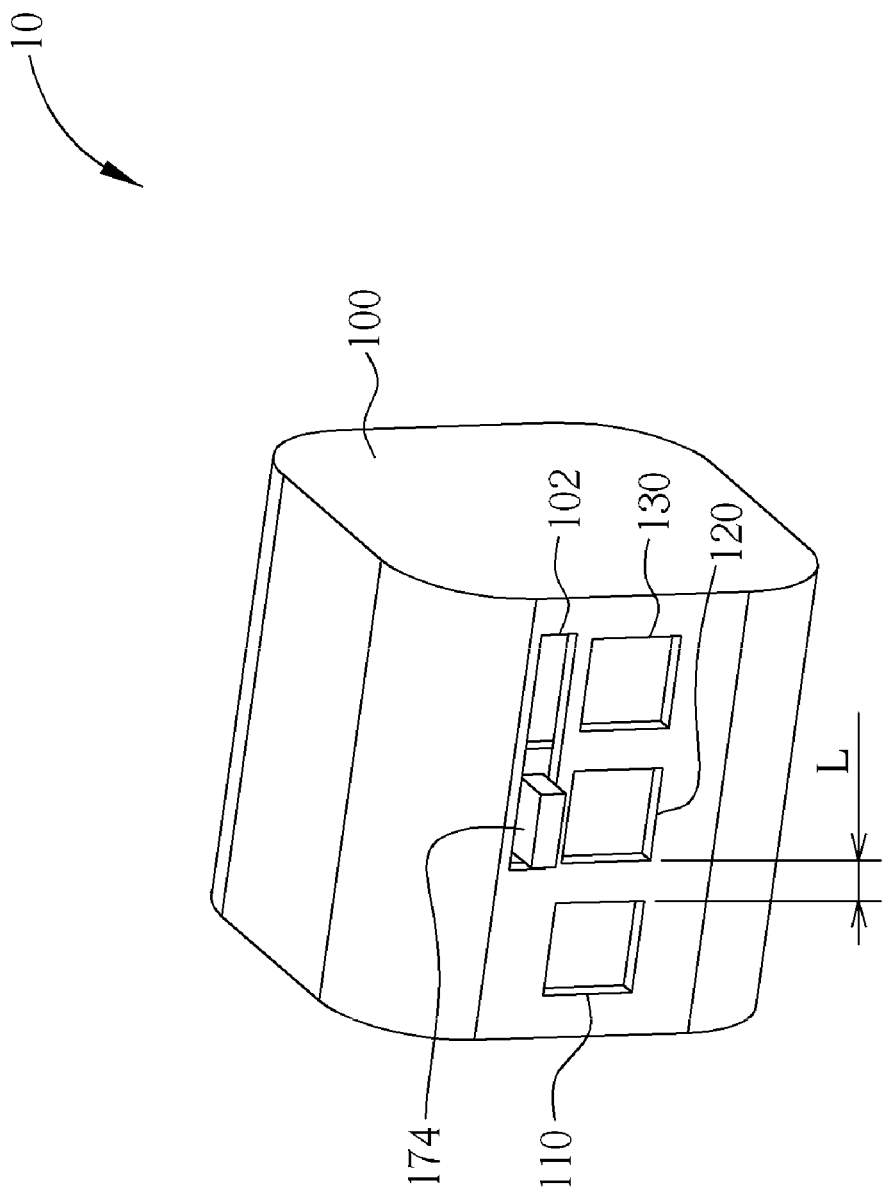
FIG. 2 is an external view of a composite image device according to FIG. 1.
Figure 3:
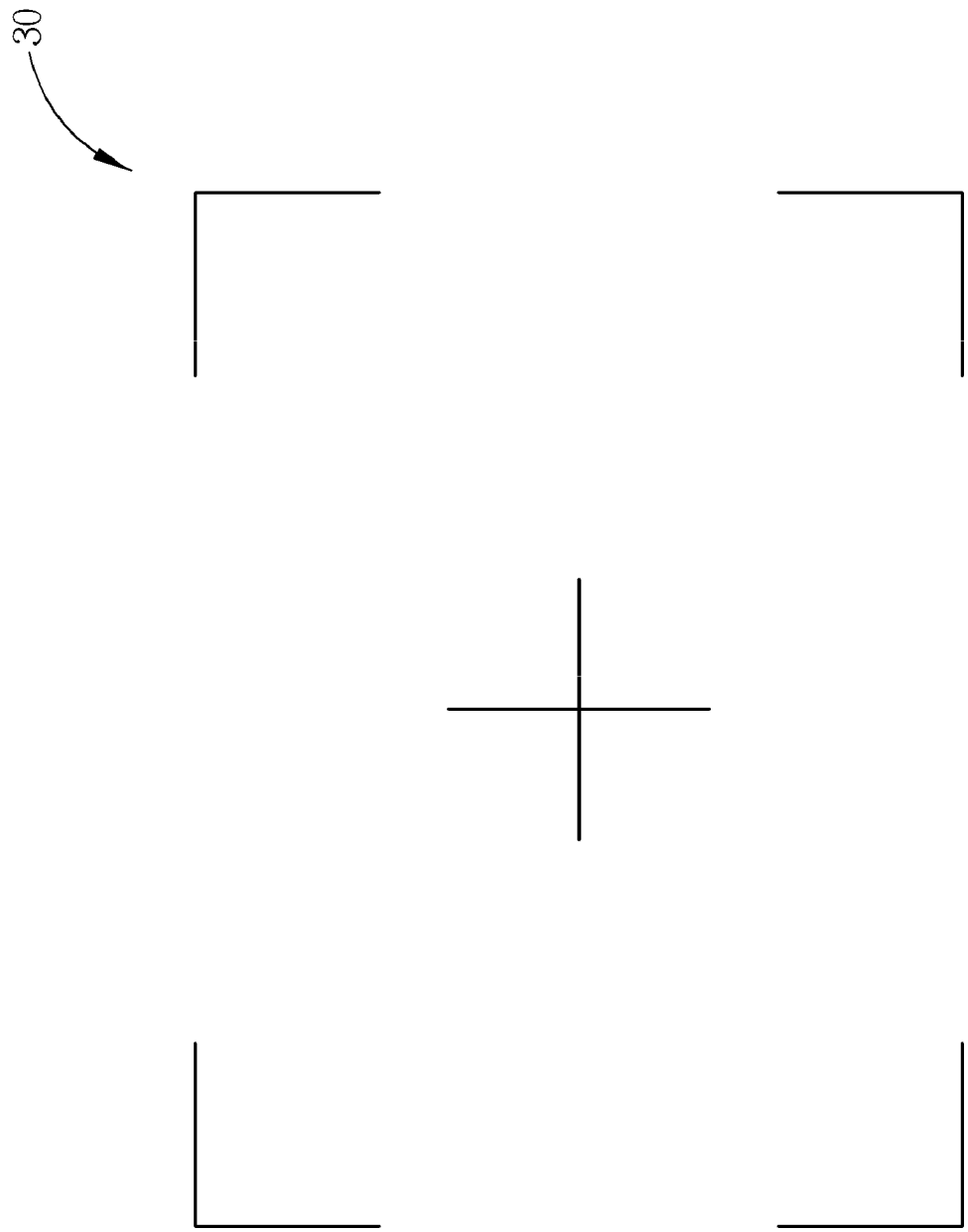
FIG. 3 is a schematic diagram of a bar code scanning area calibration pattern according to an embodiment of the present invention.

Please refer to FIG. 1 and FIG. 2. FIG. 1 is a schematic diagram of internal structure of a composite image device 10 according to an embodiment of the present invention. FIG. 2 is an external view of the composite image device 10. The composite image device 10 has image capturing, bar code scan, laser pointing, lighting and related functions and includes a housing 100, a first perspective window 110, a second perspective window 120, a third perspective window 130, an image capturing module 140, laser source module 150, a light source module 160 and a switchable light modulating module 170. The lenses 112, 122 and 132 are mounted on the first perspective window 110, the second perspective window 120, and the third perspective window 130. The image capturing module 140 includes a light-sensing device 142 and an optical lens set 144 and is used for capturing ambient light through the first perspective window 110. The light-sensing device 142 could be a Charge Couple Device (CCD) or Complementary Metal-Oxide Semiconductor (CMOS) light-sensing device. The optical lens set 144 could be a variable focus or fixed focus lens set. Besides, the image capturing module 140 includes signal processing components, such as amplifiers, analog to digital converters (ADCs) and image sensors, for processing the ambient light captured by the light-sensing device 142 and thereby generating an digital image data. The laser source module 150 includes a red laser diode 152 and is used for emitting a laser through the second perspective window 120. The light source module 160 includes a white laser diode matrix 162 and is used for emitting illuminating light through the third perspective window 130. The switchable light modulating module 170 includes a light modulating gate 172 and a switching device 174. As known in FIG. 2, the housing 100 has a rectangular gap 102 and the switching device 174 is bulged out of the housing 100. Consequently, by adjusting the position of the switching device 174, the user can move the light modulating gate 172 to a position relatively parallel to the second perspective window 120 or the third perspective window 130. The light modulating gate 172 is a diffraction gate including a diffraction lens which generates a scanning area calibration pattern and has diffraction effect only upon laser. When the light modulating gate 172 is located between the second perspective window 120 and the laser source module 150, the point light source is diffracted to a scanning area calibration pattern 30 as shown in FIG. 3 after passing through the light modulating gate 172.

When the composite image device 10 works for capturing image, the image capturing module 140 is used for capturing image, the light source module 160 is used as a flash, and the laser source module 150 is suspended.

When the composite image device 10 works for scanning a bar code with one or two dimension, the laser source module 150 projects the scanning area calibration pattern 30 through the light modulating gate 172 for calibration of bar code reception area. The image capturing module 140 is used for capturing a bar code image. The light source module 160 can be an illuminating light in the dim surroundings for enhancement of brightness and clearness.

When the composite image device 10 is used as a laser pointer, the light modulating gate 172 needs to be moved to a position relatively parallel to the third perspective window 130 in order to allow the laser emission to pass throughout the second perspective window 120 without diffraction.

As known above, the user can use functions such as image capturing, code scanning, laser pointing and illuminating by use of the composition device 10.

Please note that, the laser source module 150 can emit green laser or others, and red laser is preferable. The light source module 160 can emit green light and others, and white light is preferable. Besides, the scanning area calibration pattern 30 is just an exemplary embodiment of the present invention. Those skilled in the art can design appropriate patterns based on different bar code types.

Figure 4:
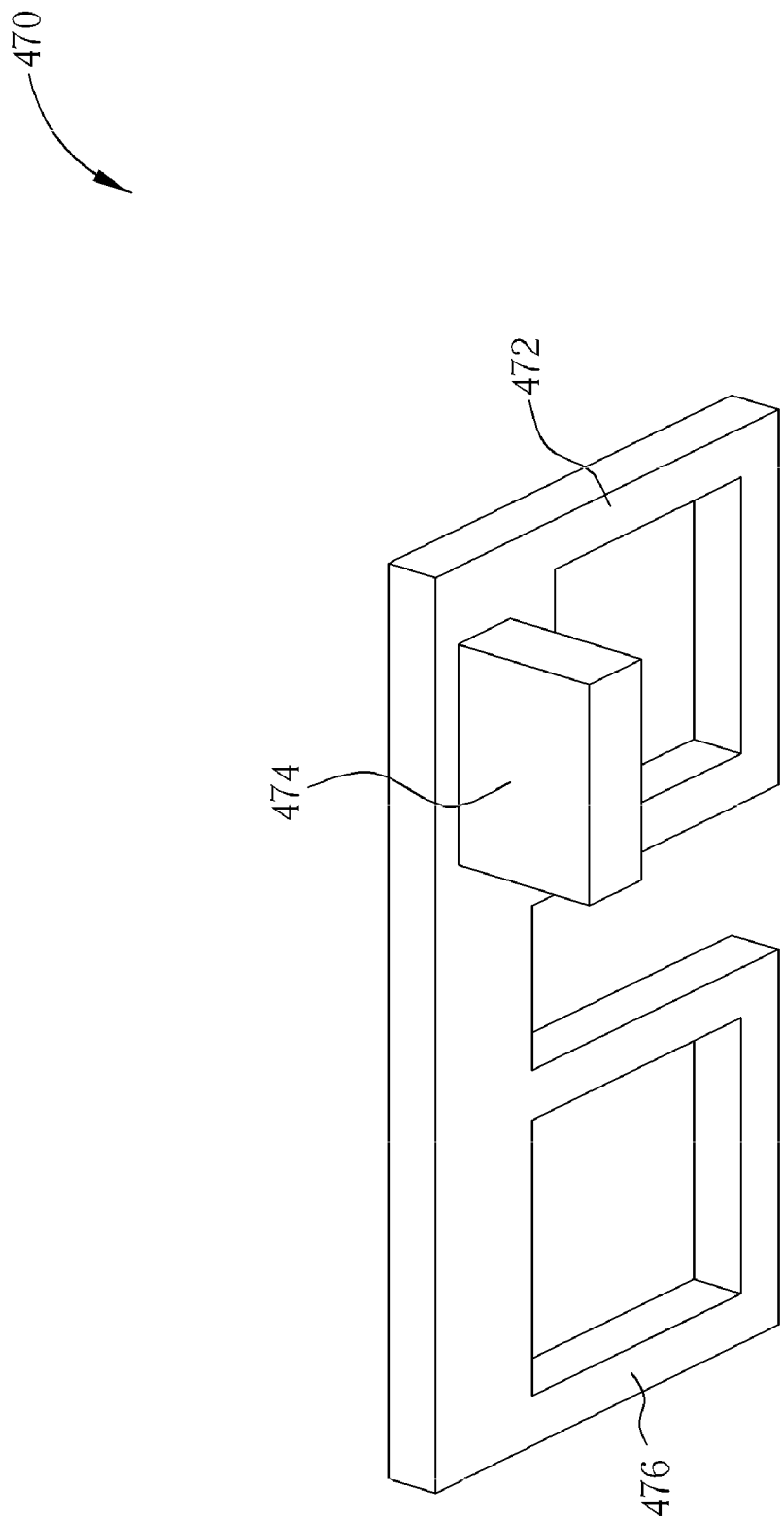
FIG. 4 is a schematic diagram of a switchable light modulating module according to an embodiment of the present invention.
Figure 5:
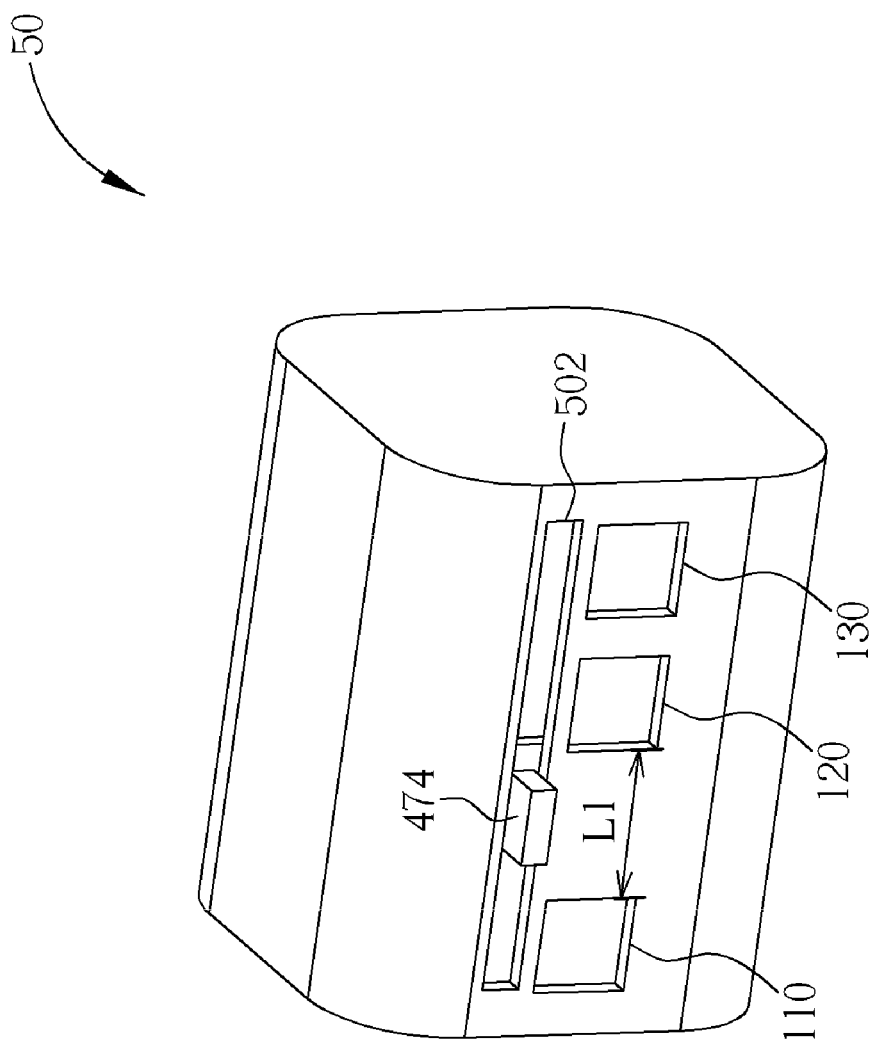
FIG. 5 is an external view of a composite image device according to the second embodiment of the present invention.

Especially, according to an embodiment of the present invention, those skilled in the art can adjust functions or the number of the switchable light modulating module 170 according to product requirements and accordingly modify the shape or position of the related devices. For example, please refer to FIG. 4, which is a schematic diagram of a switchable light modulating module 470 according to an embodiment of the present invention. The switchable light modulating module 470 includes light modulating gates 472, 476, and a switching device 474. The light modulating gate 472 and the switching device 474 are identical to the light modulating gate 172 and the switching device 1474 in FIG. 1 respectively. The light modulating gate 476 is a light filtering gate and includes a filtering lens. Please refer to FIG. 5, which is an external view of a composite image device 50 using the switchable light modulating module 470 according to an embodiment of the present invention. The external and internal structures of the composite image device 50 are similar to those of the composite image device 10. Compared with FIG. 1, a rectangular gap 502 in FIG. 5 is obtained by adjusting the size and position of that rectangular gap 102 in FIG. 1. The distance between the first perspective window 110 and the second perspective window 120 is increased from L to L1. Correspondingly, the distance between the image capturing module 140 and the laser source module 150 is increased. Thus, by shifting the switching device 474, the users can move the light modulating gate 476 to the position corresponding to the first perspective window 110 for light filtering or move the light modulating gate 472 to the position corresponding to the second perspective window 120 for diffraction pattern generation.

Figure 6:
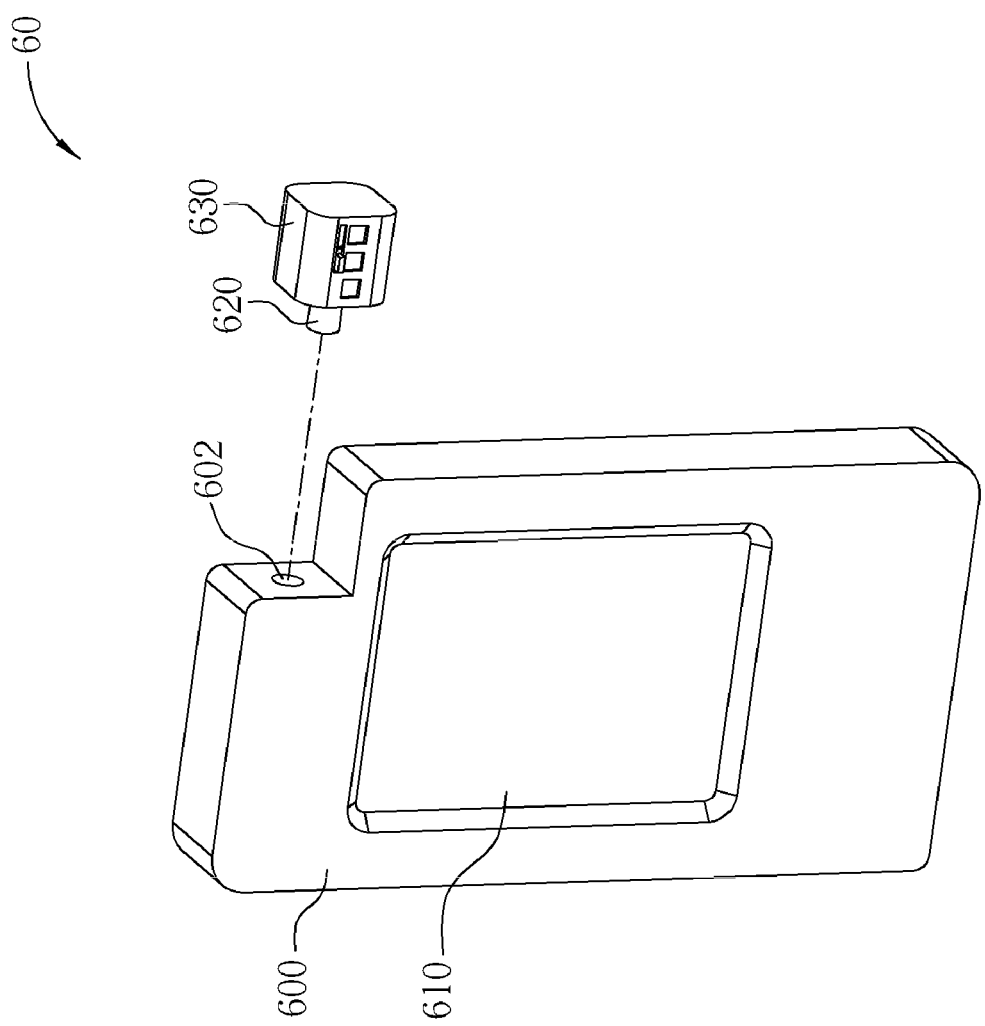
FIG. 6 is an external view of a mobile phone according to an embodiment of the present invention.

Preferably, the composite image device 10 is applied to portable electronic device such as a mobile phone, a laptop or a digital camera. In the case of the mobile phone, please refer to FIG. 6, which is an external view of the mobile phone 60 according to an embodiment of the present invention. The mobile phone 60 includes a housing 600, a display panel 610, a connecting device 620 and a composite image device 630. As can be seen in FIG. 6, the housing 600 has a cylindrical notch 602. The connecting device 620 has a cylindrical body housing that is able to be embedded into the cylindrical notch 602 for rotating the composition image device 630. In addiction, the connecting device 620 transmits the controlling signals and digital image data between the composite image device 630 and the main part of the mobile phone 60. The composite image device 630 could be the composite image device 10 in FIG. 1, the composite image device 50 in FIG. 5 or any other composite device that is properly modified by those skilled in the art. The detailed structure and functions has been described above, and thus are not narrated herein. Consequently, the user can adjust a light emitting angle for code scanning, laser pointing and illuminating by rotation of the composite image device 630 rotated by the connecting device 620.

Note that, the connecting device 620 of the mobile phone 60 is just an embodiment of the present invention. Besides rotating the composite image device, the connecting device 620 is used for mounting the composite image device 630 on the housing 600. Those skilled in the art can modify the structure and shape of the connecting device 620.

Figure 7:
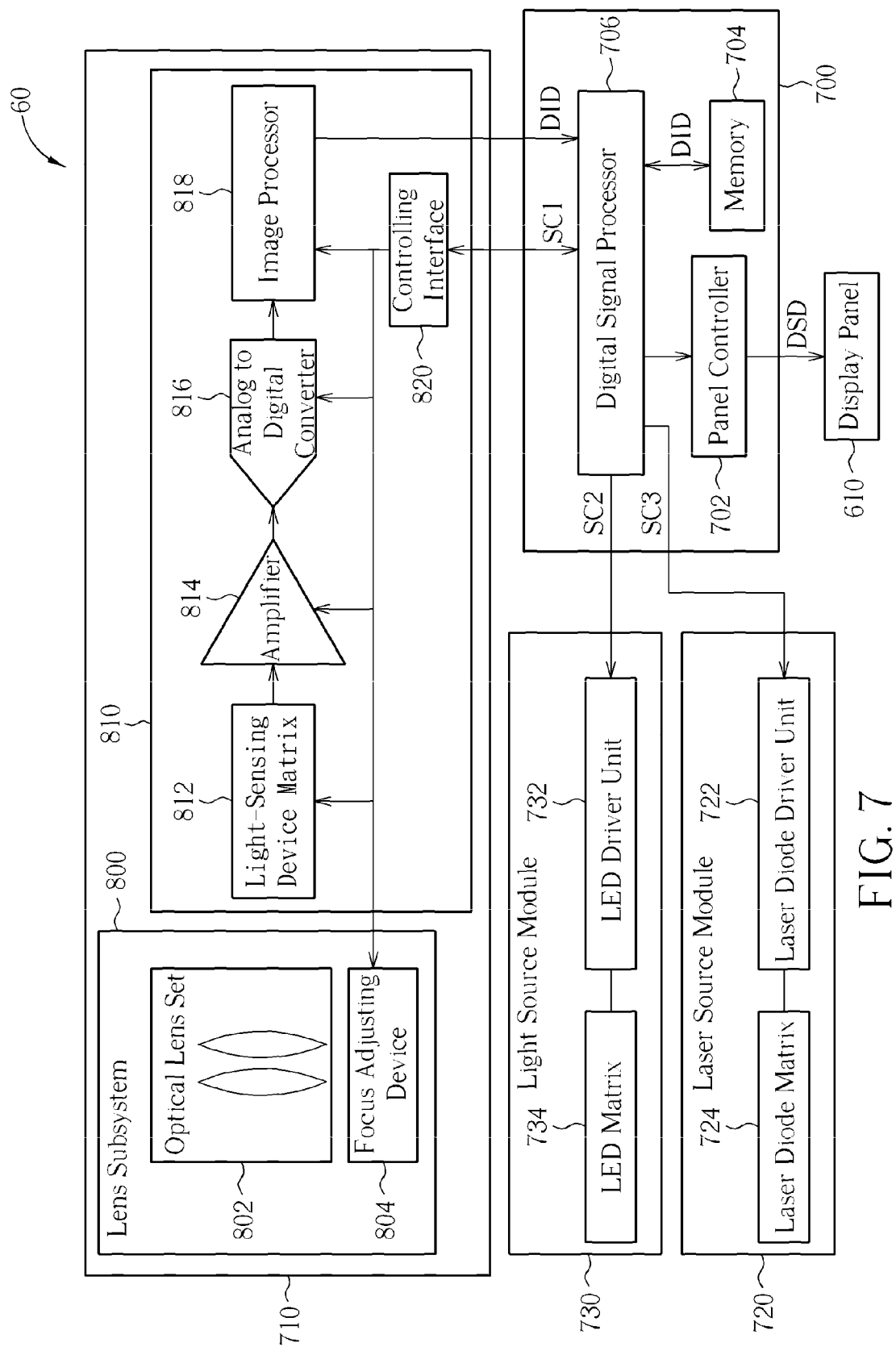
FIG. 7 is a block diagram of the mobile phone in FIG. 6.
Figure 8:
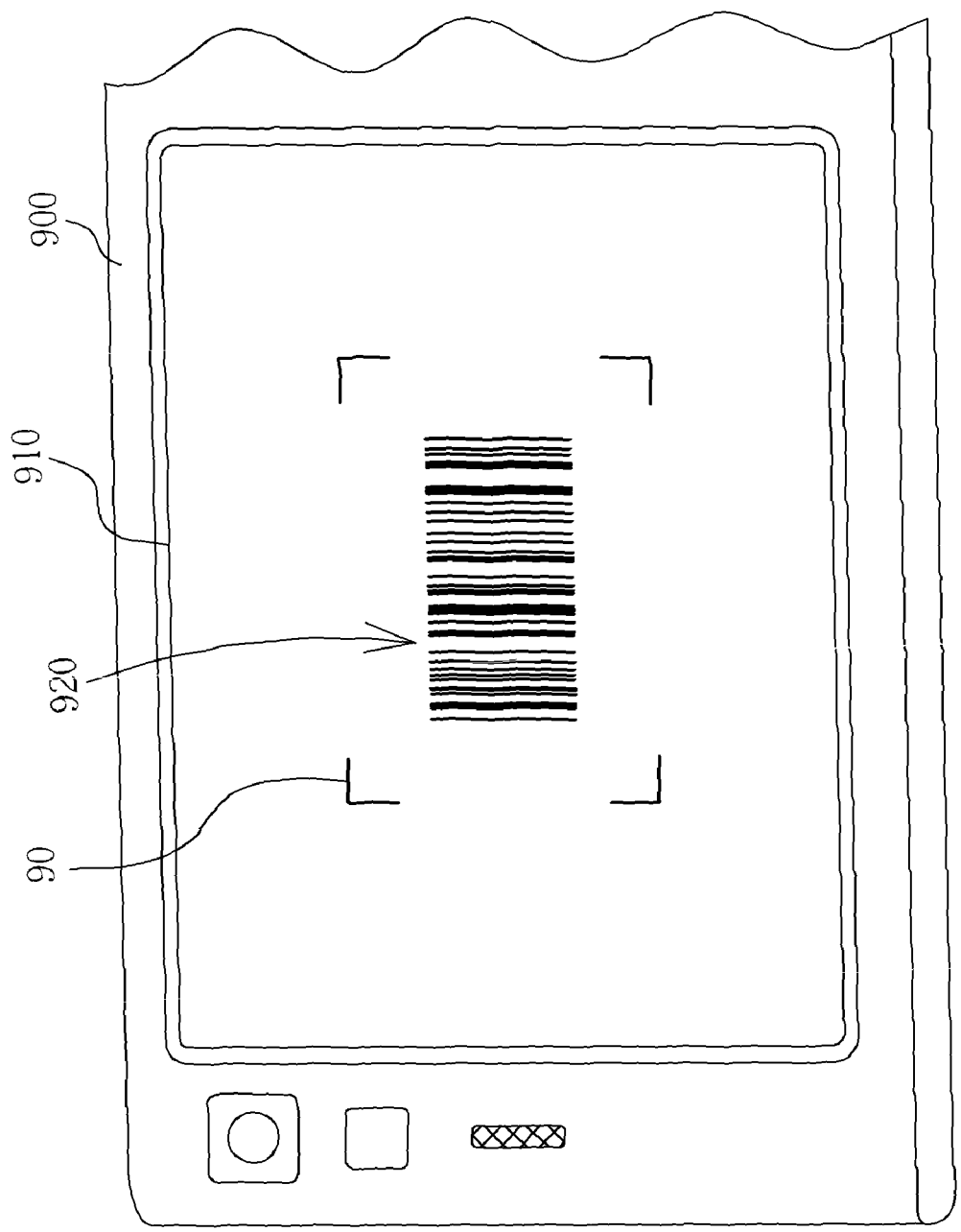
FIG. 8 is a schematic diagram of a bar code scanning area calibration pattern according to the prior art.

Please refer to FIG. 7, which is a block diagram of the mobile phone 60 according to an embodiment of the present invention. The mobile phone 60 includes a core processor system 700, an image capturing module 710, a laser source module 720 and a light source module 730. The core processor system 700 includes a panel controller 702, memory 704 and a digital signal processor 706. The digital signal processor 706 is used for processing digital image data DID generated by the image capturing module 710 and thereby outputting a display data DSD to the display panel 610 through the panel controller 702. The memory 704 is used for storing processed or unprocessed digital image data DID. Moreover, the digital signal processor 706 generates a first controlling signal SC1, a second controlling signal SC2 and a third controlling signal SC3 which are all transmitted to the composite image device 630 via the connecting device 620 in FIG. 6 for controlling the image capturing module 710, the laser source module 720 and the light source module 730 through respectively. The image capturing module 710 includes a lens subsystem 800 and a sensor subsystem 810. The lens subsystem 800 includes an optical lens set 802 and a focus adjusting device 804. The sensor subsystem 810 includes a light-sensing device matrix 812, an amplifier 814, an analog to digital converter (ADC) 816, an image processor 818 and a controlling interface 820. The first controlling signal SC1 is used for opening or closing the image capturing module 710 or instructing the controlling interface 820 to perform related image capturing mode. The controlling interface 820 generates corresponding parameters to control the optical lens set 802, the light-sensing device matrix 812, the amplifier 814, the ADC 816 and the image processor 818. The amplifier 814 and the ADC 816 are responsible for adjusting and converting light sensing signals outputted from the light sensing device matrix 812. The image processor 818 generates digital image data DID for the digital signal processor 706. The laser source module 720 includes a laser diode driver unit 722 and a laser diode matrix 724. The light source 730 includes a light emitting diode (LED) driver unit 732 and an LED matrix 734. The laser diode driver unit 722 and LED driver unit 732 drive the laser diode matrix 724 and the LED matrix 734 according to the second controlling signal SC2 and the third controlling signal SC3, respectively.

Figure 9:
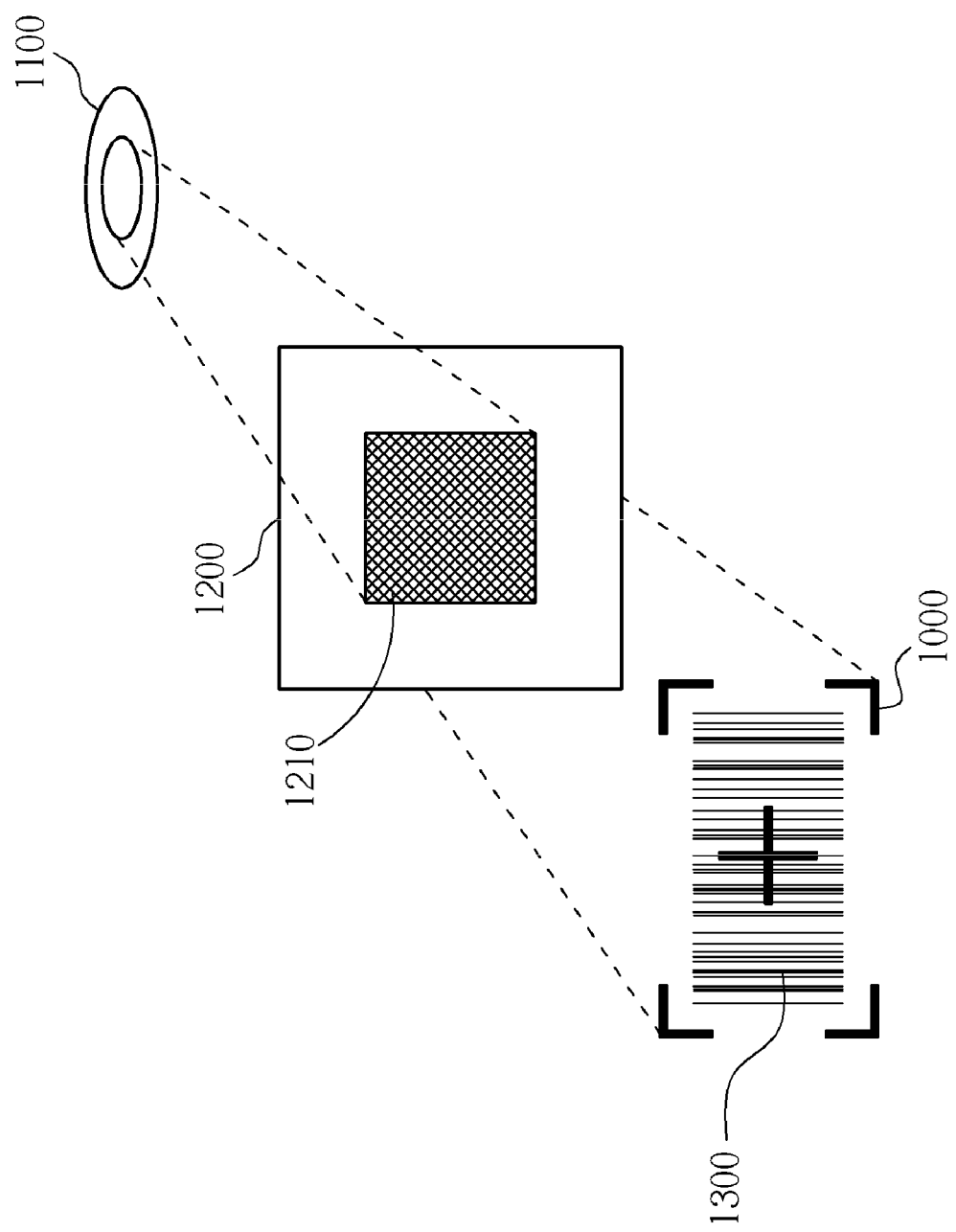
FIG. 9 is a schematic diagram of a bar code scanning area calibration pattern according to an embodiment of the present invention.

Please refer to FIG. 9, which is a schematic diagram of a scanning area calibration pattern 1000 according to an embodiment of the present invention. FIG. 9 illustrates a laser source module 1100 projecting a scanning area calibration pattern 1000 on a bar code 1300 through a diffraction lens 1210 of a diffraction gate 1200. The scanning area calibration pattern 1000 is identical to the scanning area calibration pattern 30 in FIG. 3. The laser source module 1100 and diffraction gate 1200 can be realized by the laser source module 150 and the light modulating gate 172 in FIG. 1 and thus not narrated herein.

In conclusion, the embodiments of the present invention provide a image device with image capturing, code scanning, laser pointing and illuminating functions in one and related portable electronic product for meeting users' requirement. In addiction, in the code scanning function, the scanning area calibration pattern is directly projected on the target code to eliminate the use of screen image during capturing calibration of the bar code.

Those skilled in the art will readily observe that numerous modifications and alterations of the device and method may be made while retaining the teachings of the invention.

What is claimed is:

1. A composite image device comprising:
a first perspective window;
a second perspective window;
a third perspective window;
an image capturing module comprising a light-sensing device for capturing ambient light through the first perspective window to generate digital image data;
a laser source module for emitting a laser through the second perspective window;
a light source module for emitting illuminating light through the third perspective window; and
a switchable light modulating module comprising:
at least a light modulating gate; and
a switching device coupled to the at least a light modulating gate, for moving the at least a light modulating gate to a position relatively parallel to the second perspective window or the third perspective windows to modulate the emitted laser or the emitted illuminating light.

2. The composite image device of claim 1, wherein the first perspective window comprises a lens.

3. The composite image device of claim 1, wherein the second perspective window comprises a lens.

4. The composite image device of claim 1, wherein the third perspective window comprises a lens.

5. The composite image device of claim 1, wherein the light-sensing device is a charge couple device (CCD) light-sensing device or a complementary metal-oxide semiconductor (CMOS) light-sensing device.

6. The composite image device of claim 1, wherein the at least a light modulating gate comprises a light filtering gate.

7. The composite image device of claim 1, wherein the at least a light modulating gate comprises a diffraction gate.

8. The composite image device of claim 7, wherein the diffraction gate comprises a diffraction lens generating a scanning area calibration pattern.

9. The composite image device of claim 1, wherein the laser source module comprises a laser diode.

10. The composite image device of claim 1, wherein the switching device is further used for moving the at least a light modulating gate to a position relatively parallel to the first perspective window, the second perspective window or the third perspective window to modulate the ambient light passing though the perspective window, the emitted laser, and the emitted illuminating light.

11. A portable electronic device comprising:
a housing;
a display panel;
a digital signal processor coupled to the display panel, for processing digital image data, outputting the processed digital image data to the display panel, and generating a first controlling signal, a second controlling signal and a third controlling signal;
a connecting device coupled to the digital signal processor, for transmitting the digital image data, the first controlling signal, the second controlling signal and the third controlling signal; and
a composite image device coupled to the connecting device, the composite device comprising:
a first perspective window;
a second perspective window;
a third perspective window;
a image capturing module comprising a light-sensing device for capturing ambient light through the first perspective window to generate the digital image data;
a laser source module for emitting a laser through the second perspective window;
a light source module for emitting illuminating light through the third perspective window; and
a switchable light modulating module comprising:
at least a light modulating gate; and
a switching device coupled to at least a light modulating gate, for moving the at least a light modulating gate to a position relatively parallel to the second perspective window or the third perspective windows to modulate the emitted laser or the emitted illuminating light.

12. The portable electronic device of claim 11, wherein the first perspective window comprises a lens.

13. The portable electronic device of claim 11, wherein the second perspective window comprises a lens.

14. The portable electronic device of claim 11, wherein the third perspective window comprises a lens.

15. The portable electronic device of claim 11, wherein the light-sensing device is a charge couple device (CCD) light-sensing device or a complementary metal-oxide semiconductor (CMOS) light-sensing device.

16. The portable electronic device of claim 11, wherein the at least a light modulating gate comprises a light filtering gate.

17. The portable electronic device of claim 11, wherein the at least a light modulating gate comprises a diffraction gate.

18. The portable electronic device of claim 17, wherein the diffraction gate comprises a diffraction lens generating a scanning area calibration pattern.

19. The portable electronic device of claim 11, wherein the housing comprises a cylindrical notch, and the connecting device has a cylindrical body housing capable of being embedded into the cylindrical notch, for rotating the composition image device.

20. The portable electronic device of claim 11, wherein the laser source module comprises a laser diode.

21. The portable electronic device of claim 11, wherein the switching device is further used for moving at least a light modulating gate to a position relatively parallel to the first perspective window, the second perspective window or the third perspective window to modulate the external light through the first perspective window, the emitted laser, or the emitted illuminating light.

22. The portable electronic device of claim 11, wherein the composite image device is mounted on the housing via the connecting device.

* * * * *